United States Patent [19]

Valeri

[11] 4,029,354
[45] June 14, 1977

[54] PROTECTIVE STRIP OVERLAY FOR TRUCK BOXES

[75] Inventor: William J. Valeri, Hibbing, Minn.

[73] Assignee: Irathane Systems Incorporated, Hibbing, Minn.

[22] Filed: Jan. 21, 1976

[21] Appl. No.: 651,063

[52] U.S. Cl. .................... 296/28 D; 220/63 R; 296/39 R; 105/423; 29/451; 52/177; 52/468
[51] Int. Cl.² .......................... B62D 33/00
[58] Field of Search .......... 296/28 D, 39 R, 39 A; 52/511, 509, 468, 470, 471, 403, 177; 105/423; 220/63 R

[56] References Cited

UNITED STATES PATENTS

| | | | |
|---|---|---|---|
| 2,209,290 | 7/1940 | Watts | 220/63 R |
| 2,446,323 | 8/1948 | Davis | 52/403 X |
| 3,290,844 | 12/1966 | Rushton | 52/468 |
| 3,578,375 | 5/1971 | Finefrock | 296/39 R |
| 3,652,123 | 3/1972 | Speers | 296/28 D |
| 3,702,024 | 11/1972 | Baker | 220/63 |
| 3,868,802 | 3/1975 | Schubach | 52/468 |
| 3,912,325 | 10/1975 | Sudyk | 296/28 D |
| 3,942,239 | 3/1976 | Johansson | 105/423 |

Primary Examiner—Richard J. Johnson
Attorney, Agent, or Firm—Stuart R. Peterson

[57] ABSTRACT

A pair of elongated anchors possessing a Z-shaped cross section each have one flange embedded in one side of an elastomeric block and its other flange welded to the metal surface of the truck box to be protected. The sides of each block are angled so as to form a converging slot between blocks. An elongated strip, also of elastomeric material and somewhat softer than that of the blocks, is pressed into each slot to create a generally flush relation with the blocks.

15 Claims, 5 Drawing Figures

U.S. Patent  June 14, 1977  4,029,354
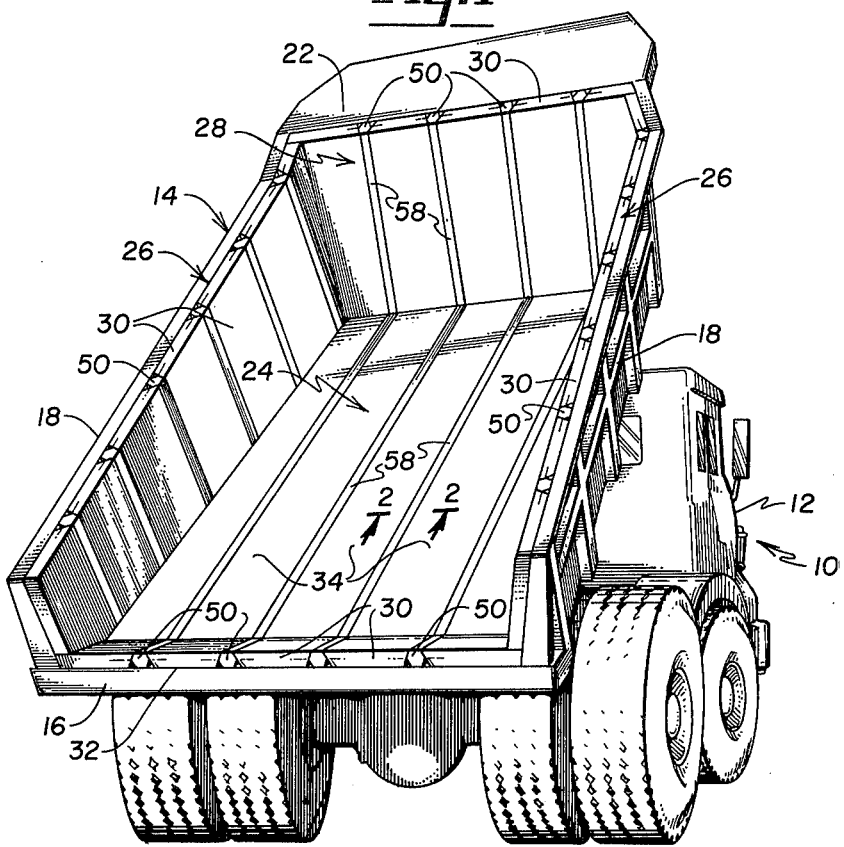
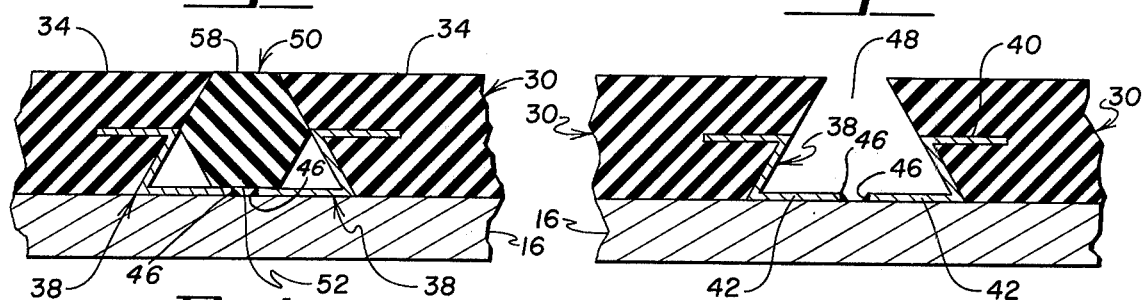
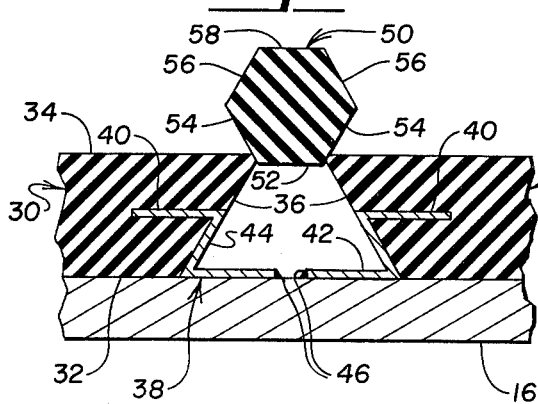
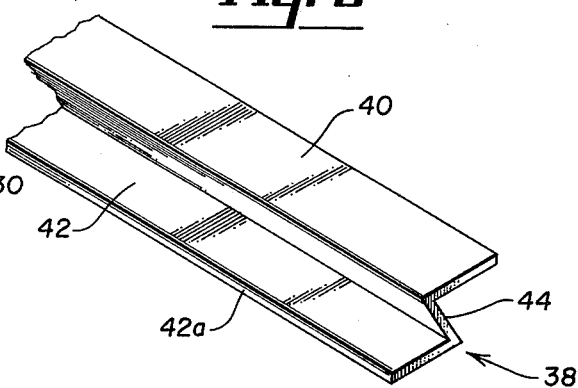

PROTECTIVE STRIP OVERLAY FOR TRUCK BOXES

BACKGROUND OF THE INVENTION

1. Field of the Invention

This invention relates generally to the protection of truck boxes, and pertains more particularly to a system utilizing a plurality of elastomeric blocks and strips, the blocks being held in place by anchors welded to the surface to be protected.

2. Description of the Prior Art

In various earthmoving operations, large trucks are used to haul the excavated material, the material frequently consisting of rocks, gravel, sand and other abrasive-laden chunks and particles, such as ore when the operation is concerned with mining. Owing to the usual manner of loading the trucks, the walls of the truck box, especially its bottom wear away rather rapidly if not properly protected. More specifically, power shovels used to excavate the earth scoop up a bucketful of earth, and dump the load into the truck box of the waiting vehicle. The impact of the falling rocks and the like can quickly cause severe damage to the truck box walls.

Because of the foregoing, various attempts have been made to protect the metal surfaces of truck boxes. The attempts with which I am familiar have necessitated the drilling of holes in the bottom and side walls of the truck box. Efforts of this type have not only been time-consuming, but frequently have necessitated careful alignment of the drilled holes with the holes provided in the liners or cushioning means to be retained in place.

SUMMARY OF THE INVENTION

An important object of my invention is to provide an effective protective overlay for the highly vulnerable metal surfaces of truck boxes without having to drill holes through the metal. More specifically, an aim of the invention is to provide clocks of elastomeric material having elongated anchors attached thereto which can be welded to the steel to be protected.

Another object of the invention is to provide an overlay system for the metal surfaces of a truck box which can be readily installed and which will be long-lasting even though subjected to rather severe impace loads. Also, it is within the purview of the invention to permit easy replacement of the system, or whatever portions require replacement, should circumstances so dictate.

Still another object of the invention is to provide a protective system for the steel walls of a truck box which can be provided and installed at a relatively low cost, thereby encouraging its widespread adoption.

Yet another object is to provide an overlay system that need not be specifically designed for a given truck box, it being possible to cut and trim the elastomeric blocks to whatever size and dimension needed to cover the surface to be protected.

Briefly, my invention contemplates the use of a plurality of elastomeric blocks having anchors extending along the sides thereof. One flange of each anchor is embedded in the block and the other flange is welded to the metal surface to be protected. The sides of te elastomeric blocks are angled so that, when the various anchors are welded in place, a slot having converging sides remains. An elongated strip of somewhat softer elatomeric material is then pressed into the slot, the strip in each instance having sloping surfaces such that it can be readily wedged in place. The strip becomes somewhat deformed as it is forced into its slot but expands back to its original shape when fully received in its slot, thereby locking itself in palce between the two blocks adjacent thereto. It is intended that polyurethane be used as the elastomeric material, thereby enabling the installer, when necessary, to cut the blocks and strips to whatever size is needed in order to cover completely the particular metal surface of the truck box to be protected.

BRIEF DESCRIPTION OF THE DRAWINGS

FIG. 1 is a perspective view of a vehicle having a truck box utilizing my protective overlay system;

FIG. 2 is an enlarged sectional view taken in the direction of line 2—2 of FIG. 1 in order to illustrate the manner in which the protective blocks and strips are held in place;

FIG. 3 is a sectional view corresponding to FIG. 2 but prior to the insertion of a strip into the slot between adjacent blocks;

FIG. 4 is a view corresponding to FIGS. 2 and 3 but illustrating the strip as it is being pressed into the slot of FIG. 3, and FIG. 5 is a fragmentary perspective view of one of the anchors utilized in practicing my invention.

DESCRIPTION OF THE PREFERRED EMBODIMENT

In order to exemplify my invention, a vechicle 10 has been pictured in FIG. 1 having a cab 12 and a steel truck box 14. For the sake of illustration, it will be assumed that the bottom 16, sides 18 and front 22 of the truck box 14 are all to be protected. These are metal surfaces that are subject to rather severe impact loads, particularly those stemming from the dumping of earth, such material as iron ore, into the truck box 14. It will be understood that where mechanical loading equipment of the shovel type is employed, which makes use of a relatively large bucket, the emplacement or dropping of the earth or ore into the truck box 14 produces an appreciable amount of abrasion.

As far as FIG. 1 is concerned, my system is acutally composed of various individual overlays. In this regard, the bottom 16 of the truck box 14 has an overlay 24. The sides 18 of the truck body are each protected with an overlay labeled 26, whereas the front wall 22 has an overlay 28.

Since the various individual overlays 24, 26 and 28 are basically identical, at least as far as illustrating my invention, only the overlay 24 which covers the flat bottom 16 of the truck box 14 will be described in detail. In this regard, it will be observed that the overlay 24 is composed of a plurality of elastomeric blocks 30. While various elastomeric materials can be employed, it is preferred that polyurethane be used. Typically, polyurethane can be fabricated with the optimum degree of wearability, tear strength hardness and resiliency. In this regard, polyurethane can be obtained with a durometer rating of 95 on the A scale. Certain types of rubber, if of the proper degree hardness, are also satisfactory. Basically, the material that is selected should not only have the proper amount of resiliency but should possess good tear strength as well. Obviously, some conditions of use are more severe than others, so that material selection is at least somewhat dependent on the abuse likely to be encountered in a given situation.

Whereas each block 30 is provided with parallel planar surfaces 32, 34, the side surfaces labeled 36 are inclined for a purpose soon to be made manifest. Playing an important role in the practicing of my invention is a steel anchor 38 fragmentarily pictured in FIG. 5. The anchor 38 generally possesses the same length as the particular block 30 with which it is associated. It will be perceived that the anchor 38 has a Z-shaped cross section formed by a pair of parallel flanges 40, 42 and an angled web 44, the flanges 40, 42 forming acute angles with respect to the web 44. Also, for the sake of facile later reference the flange 42 has an edge identified by the reference numeral 42a.

Each block 30 utilizes two anchors 38. In order to attach in a secure manner the anchors 38 to each block 30, it is planned that the upper flange 40 be embedded in the body of the block 30. Also, it is intended that the web 44 have an inclination corresponding to the sloping side 36. Thus, as can be seen from FIGS. 2–4, the webs 44 of the anchors 38 extend not only at the same angle that the side walls 36 converge, but are rendered flush therewith. The lower flanges 42 project away from the sloping surface or side wall 36 for a purpose now to be described.

It is to be noted that the edge 42a of each anchor 38 is welded at 46 to the bottom 16 of the truck box 14. The welds 46 can be continuous, that is in the form of beads or seams, or they can be spot or tack welds located at spaced intervals along the edge 42a of each anchor 38. It is important, though, that the edges 42a be welded in a laterally spaced relation to provide a slot 48 between adjacent blocks 30. The slot 48, owing to the angulation imparted to the sides 36 of the blocks, converges in a direction from the faces 32, which confront the bottom 16, toward the faces 34, which are struck by the material dumped into the truck box 14.

A strip 50, also of elastomeric material but preferably of somewhat softer polyurethane than that of the blocks 30 is inserted into each slot 48. From FIG. 4 it will be observed that the particular resilient strip 50 appearing in this view has relatively narrow bottom face 52, diverging lower side faces 54, converging upper side faces 56 and a top face 58 having a width corresponding to the top of the slot 48. More specifically, the bottom face 52 is somewhat narrower than the width of the slot 48 at its upper end so that the face 52 readily enters the slot 48, as can be seen in FIG. 4. The sloping faces 54 then function as camming surfaces, acting against the upper edges of the side surfaces 36 to compress of deform the resilient strip 50 sufficiently to permit its reception in the slot 48, as it is forced downwardly, such as with a sledge hammer. Once in the slot 48, the strip 50 expands or resumes its original shape, as is believed evident from FIG. 2, so that it is for all intents and purposes locked in the slot, the faces 56 bearing against the side surfaces 36 (FIG. 2) to resist dislodgment. The cross section of the strips 50 is dimensioned so that when installed, as described above, the top faces 58 of the various strips 50 are generally flush with the uper surfaces 34 of the blocks 30. Consequently, it will be appreciated, there is no area left exposed, as far as the bottom 16, that could be struck and damaged by abrasive material when dumped into the truck box 14.

It is believed obvious that the two side overlays 26 and the forward overlay 28 are installed in the same general manner as the bottom overlay 24. Because the upper edges of the sides 18 slope rearwardly, the blocks 30 of the overlays 26 are arranged vertically. However, the blocks 30 of the overlays 26 could extend parallel to the blocks 30 of the bottom overlay 26, especially where truck boxes having rectangular sides are encountered.

After the various overlays 24, 26 and 28 have been installed, in order to prevent any longitudinal shifting to the rear of the blocks 30 contained in the bottom overlay 24 due to impact forces, suitable retaining members can be used at the rear end of the overlay 24. For instance, in order to prevent the blocks 30 of the bottom overlay 24 from moving rearwardly, a horizontal metal strip could have its lower marginal edge welded to the end of the bottom 16, the strip extending upwardly into an obstructive relation with the ends of the blocks 30 and also the strips 50. However, such a retaining strip in not a part of my invention and, if illustrated, would only conceal from view to some degree the ends of the members 30, 50, thereby at least partially obscuring what the drawing is intended to show.

As far as the side overlays 26 are concerned which confront the inner surfaces of the sides 18 of the truck box 14, it will be seen that the upper ends of the various blocks 30 and strips 50 require cutting at an angle in order to conform to the slope of the upper edges of the sides 18. This is readily achieved by sawing, the sawing not only shaping the upper ends of the blocks 30 and strips 50, respectively, but also cutting through the vertically oriented anchors 38 that extend above the sides 18. The anchors 38 can be of relatively light gauge stock and readily cut with any conventional saw designed for metal cutting.

Whereas the blocks 30 of the bottom overlay 24 have been shown as extending virtually the entire length of the truck box 14, it will be appreciated that the blocks 30 can be of shorter length, actually a more practical arrangement in many instances as hereinafter explanined, and that a number of such shorter blocks be employed in an end-to-end manner to cover the full length of the bottom 16. The same thing holds true for the overlays 26 and 28, for these require considerably shorter blocks 30 (even before trimming) than the blocks 30 included in the bottom overlay 24.

The salient advantage derived from my system of overlaid blocks 30 stems from the fact that no holes need be drilled in any portion of the steel truck box 14. All that need be done is to make simple welds 46 which secure the anchors 38 to the particular metal surface to be protected. While the overlays 24, 26 and 28 will last indefinitely, the abrasive character of the material being dumped into the truck box 14 will affect the life of the blocks 30 and strips 50 sandwiched therebetween. Should any replacement be required, the particualr strip (or strips) 50 can be chiseled out so as to expose the welds 46. Chipping away the exposed welds 46 will detach the particualar anchors 38 so that the worn blocks 30 can be completely removed and replaced with new blocks 30. Of course, the entire overlay, such as the overlay 24, can be replaced if desired. Thus, a considerable amount of descretion is permitted as to the extent of overlay replacement.

It might be helpful to give certain typical dimensions. In this regard, the blocks 30, when of polyurethane, would be on the order of 3½ inches thick, that is in a direction measured between the faces 32, 34. The combined width of the blocks 30 would normally be such as to totally cover the surface to be protected; basically, widths of approximately 2 feet are contemplated. As for length, the blocks 30 can extend the full length of the bottom 16; however, a length of 5 feet is more practical and easier to handle, enough blocks 30 then being placed end-to-end to cover the length of the bottom 16. The sides 36 of the blocks 30 form an angle of 75° with the faces 32, 34. Hence, the flanges 40, 42 of the anchors 38 also form such an acute angle with their webs 44. It is intended that the flange 40 be embedded in its particular block 30 at a location from the face 32 approximating 40% of the distance between faces 32, 34. Each flange 40, 42 would have a width of roughly 2 inches and spaced apart about 1 inch (which would make the height of the web a little longer than this because of its angulation). The height or thickness of the strips 50, that is between the faces 52 and 54, is on the order of 3½ inches (about the same as the thickness of the blocks 30). With the width of spacing the slots 48 at their top being approximately 2½ inches, the width of the strip face 52 would be on the order of 2 inches, that is slightly less than the width of the top of the slot 48 so that it readily enters the slot as can be discerned in FIG. 4. However, the face 58 should equal the slot width at the top; that is the face 58 should have a width of 2½ inches. Since the sides 36 of the blocks form and angle of 75° with the faces 32, 34, it follows that the faces 56 should be at this same angle. Their width is not too important, being susceptible to considerable variation as long as a sufficient area confronts each side 36 to retain the strip 50 snugly in place within the slot 48. As far as the faces 54 re concerned, neither the angle or area is particularly critical. The angle should be such that a facile wedging can be achieved, though; the area is not important because the faces 54 do not contact any portion of the sides 36.

I claim:

1. A protective overlay system for a metal truck box comprising a plurality of blocks of impact-resistant material having one face confronting the truck box surface to be protected, adjacent blocks being laterally spaced so as to provide an elongated slot therebetween, and anchor means for each block having a first portion thereof secured to its block and a second portion extending from its said block, said second portions of adjacent anchor means being laterally spaced and said second portions being welded to the surface to be protected, said slot in each instance providing access to said surface in order to permit the welding of said laterally spaced second portions.

2. A protective overlay system in accordance with claim 1 including an elongated strip of impact resistant material in each slot.

3. A protective overlay system for a metal truck box comprising a plurality of blocks of impact-resistant elastomeric material having one face confronting the truck box surface to be protected, adjacent blocks being laterally spaced so as to provide an elongated slot therebetween, anchor means for each block having a first portion thereof secured to its blocks and a second portion extending from its said block which second portion is welded to the surface to be protected, said slot in each instance providing access to said surface in order to permit the welding of said second portion, and a strip of impact-resistant elastomeric material in each slot.

4. A protective overlay system in accordance with claim 3 in which said strip are softer than said blocks.

5. A protective overlay system in accordance with claim 4 in which said elastomeric material is polyurethane.

6. A protective overlay system for a metal truck box comprising a plurality of blocks of impact-resistant material having one face confronting the truck box surface to be protected, adjacent blocks being laterally spaced so as to provide a slot therebetween, anchor means for each block having a first portion thereof embeddingly secured to its block and a second portion welded to the surface to be protected, said slot in each instance providing access to said surface in order to permit the welding of said second portion, and an elongated strip of impact-resistant material in each slot.

7. A protective overlay system for a metal truck box comprising a plurality of elastomeric blocks of impact-resistant polyurethane having one face confronting the truck box surface to be protected, adjacent blocks being laterally spaced so as to provide an elongated slot therebetween anchor means for each block including first and second generally parallel flanges and web extending between said flanges to maintain the second flange in an oppositely extending direction relative said first flange, each first flange being embeddingly secured to its block and each second flange being welded to the surface to be protected, said slot in each instance providing access to said surface in order to permit the welding of said second flange, and an elastomeric strip of impact-resistant polyurethane in each slot, said elongated strip being softer than said blocks.

8. A protective overlay system in accordance with claim 7, in which the sides of adjacent blocks are angled so as to converge toward each other in a direction away from their said confronting faces to impart a corresponding convergence to said slots.

9. A protective overlay system in accordance with claim 8 in which there are two anchor means for each block, the webs of said two anchor means having the same angle as the sides of said blocks.

10. A protective overlay system in accordance with claim 9 including a resilient strip in each slot.

11. A protective overlay system in accordance with claim 10 in which each strip has a pair of faces angled to confront the angled sides of said blocks.

12. A protective overlay system in accordance with claim 11 in which each strip has an upper face having a width corresponding to the width of the top of the slot in which it resides.

13. A protective overlay system in accordance with claim 12 in which each strip has a bottom face having a width less than the width of the top of the slot in which it resides.

14. A protective overlay system in accordance with claim 13 in which each strip has a second pair of angled faces diverging from said bottom face toward said first-mentioned angled faces to provide camming surfaces to facilitate the insertion of each strip in its slot.

15. A protective overlay system for a metal truck box comprising a plurality of blocks of impact-resistant material having one face confronting the truck box surface to be protected, adjacent blocks being laterally spaced so as to provide an elongated slot therebetween, and anchor means for each block having a first portion thereof embeddingly secured to its block and a second portion extending from its said block, said second portions being welded to the surface to be protected, said slot in each instance providing access to said surface in order to permit the welding of said second portion and an elongated strip of impact-resistant material in each slot.

* * * * *